United States Patent
Woodworth et al.

(10) Patent No.: US 9,768,967 B2
(45) Date of Patent: Sep. 19, 2017

(54) NUMERIC PATTERN NORMALIZATION FOR CRYPTOGRAPHIC SIGNATURES

(71) Applicant: CenturyLink Intellectual Property LLC, Denver, CO (US)

(72) Inventors: John R. Woodworth, Amissville, VA (US); Dean Ballew, Sterling, VA (US); Shashwath Bindinganaveli Raghavan, Gaithersburg, MD (US)

(73) Assignee: CenturyLink Intellectual Property LLC, Denver, CO (US)

( * ) Notice: Subject to any disclaimer, the term of this patent is extended or adjusted under 35 U.S.C. 154(b) by 78 days.

(21) Appl. No.: 14/984,105

(22) Filed: Dec. 30, 2015

(65) Prior Publication Data
US 2016/0380773 A1 Dec. 29, 2016

Related U.S. Application Data

(60) Provisional application No. 62/185,221, filed on Jun. 26, 2015.

(51) Int. Cl.
*H04L 29/06* (2006.01)
*H04L 9/32* (2006.01)

(52) U.S. Cl.
CPC .......... *H04L 9/3247* (2013.01); *H04L 9/3242* (2013.01)

(58) Field of Classification Search
CPC ............................ H04L 9/3247; H04L 9/3242
USPC ........................................................ 713/176
See application file for complete search history.

(56) References Cited

U.S. PATENT DOCUMENTS

| 7,904,555 B2 | 3/2011 | Nooner et al. |
| 8,504,537 B2 | 8/2013 | Iglesia et al. |
| 8,918,466 B2 * | 12/2014 | Yu ................... H04L 51/12 709/206 |

(Continued)

FOREIGN PATENT DOCUMENTS

| EP | 1030282 A1 | 8/2000 |
| WO | WO-2017/023396 A2 | 2/2017 |

OTHER PUBLICATIONS

International Search Report and Written Opinion prepared by the Korean Intellectual Property Office as International Searching Authority for PCT International Patent Application No. PCT/US16/32874, mailed Feb. 16, 2017, 10 pages.

*Primary Examiner* — Michael S McNally
(74) *Attorney, Agent, or Firm* — Swanson & Bratschun, L.L.C.

(57) ABSTRACT

A system for numeric pattern normalization for cryptographic signatures is provided. The system includes a resolving client, and an at least one signature server. The at least one signature server includes at least one processor and non-transitory computer readable media having encoded thereon computer software comprising a set of instructions executable by the at least one processor. The set of instructions may be executed by the signature server to generate a message to be transmitted to a resolving client, normalize the message via numeric pattern normalization, generate a hash value for the normalized message, and generate a cryptographic signature based on the hash value. The signature server may then generate a signed message having the message signed with the cryptographic signature, and transmit the signed message to the resolving client.

20 Claims, 7 Drawing Sheets

(56) References Cited

U.S. PATENT DOCUMENTS

| | | | |
|---|---|---|---|
| 2005/0039019 A1* | 2/2005 | Delany | H04L 12/58 |
| | | | 713/176 |
| 2006/0107055 A1 | 5/2006 | Panwar et al. | |
| 2012/0041881 A1* | 2/2012 | Basu | G06Q 20/02 |
| | | | 705/67 |
| 2012/0278626 A1 | 11/2012 | Smith et al. | |
| 2016/0380773 A1 | 12/2016 | Woodworth et al. | |

\* cited by examiner

NUMERIC PATTERN NORMALIZATION FOR CRYPTOGRAPHIC SIGNATURES

CROSS-REFERENCES TO RELATED APPLICATIONS

This application claims priority to U.S. Provisional Patent Application Ser. No. 62/185,221 filed on Jun. 26, 2015 by John R. Woodworth et al., entitled, "Numeric Pattern Normalization for Cryptographic Signatures," the disclosures of which are incorporated herein by reference, in its entirety, and for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to cryptographic signatures, and more particularly to a flexible framework for cryptographic signatures for use with pattern generated data in scalable environments.

BACKGROUND

Cryptographic signatures, also referred to as digital signatures, have become an increasingly ubiquitous way of authenticating both message origin and message integrity, as well as providing non-repudiation for cryptographically signed data. Generally, a valid cryptographic signature ensures that the message originates from a known sender, the known sender in fact signed the message, and the content of the message has not been tampered.

Conventional techniques rely on several steps to create and verify a cryptographic signature. Broadly speaking, these steps include a key generation algorithm to create a public and private key-pair; a signing algorithm to produce the cryptographic signature and signed message; and a verification algorithm to verify the cryptographic signature. Typically, a unique cryptographic signature must be created for each signed message, respectively.

For example, one context in which cryptographic signatures are utilized extensively is in domain name system security extensions (DNSSEC). In DNSSEC, cryptographic signatures may be utilized by a domain name system (DNS) name server to provide DNS clients, also referred to as resolvers, with authentication of DNS data origin and integrity. DNSSEC is mainly designed to provide answers, to DNS queries, that are cryptographically signed by an authoritative name server in a DNSSEC protected zone. DNSSEC is most often utilized to protect internet protocol (IP) address information provided by the DNS, such as the RDATA field in corresponding resource records (RR), such as A-type and AAAA-type RRs.

However, as the size of the internet has grown, and continues to grow, the deployment of DNSSEC and use of cryptographic signatures has proven to be problematic. For example, DNSSEC deployments may significantly increase computational loads on DNS servers, as each answer is signed by a uniquely generated cryptographic signature. Moreover, signed answers in DNSSEC are usually much larger in size than typical non-DNSSEC answers. This further increases demands on the network and computational loads on the DNS.

Thus, a system for providing numeric pattern normalization for the cryptographic signing of pattern-based data is provided by the embodiments below.

BRIEF SUMMARY

According to various embodiments, a system, apparatus, and method for implementing numeric pattern normalization for cryptographic signatures are provided.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for numeric pattern normalization for cryptographic signatures may include a resolving client in communication with a plurality of name servers, and an at least one signature server of the plurality of name of the plurality of name servers. Each of the at least one signature server may include at least one processor, and non-transitory computer readable media having encoded thereon computer software comprising a set of instructions executable by the at least one processor. Execution of the instructions causes the at least one signature server to generate a message to be transmitted to a resolving client. The signature server may then normalize the message, via numeric pattern normalization. Numeric pattern normalization may further include defining at least one ignore range within the message, identifying at least part of the message that is within the ignore range, defining an at least one tokenization range indicating which values are to be tokenized, defining at least one token value corresponding to the at least one tokenization range, and replacing all parts of the message, not within the ignore range and having values within the at least one tokenization range, with the at least one token value. The signature server may be programmed to then generate a hash value for the normalized message. Based on the hash value, the signature server may generate a cryptographic signature, wherein the cryptographic signature includes the hash value encrypted with a private key, wherein the private key has a corresponding public key. The signature server may then generate a signed message having the message signed with the cryptographic signature, and transmit the signed message to the resolving client.

According to a set of embodiments, resolving client may itself further include at least one processor, and non-transitory computer readable media having encoded thereon computer software comprising a set of instructions executable by the at least one processor. This may cause the resolving client to receive, via the at least one signature server, the signed message having both the cryptographic signature and message. The resolving client may then decrypt the cryptographic signature with the public key to yield a decrypted hash value. The resolving client may then, on its own, normalize the received message, via numeric pattern recognition, utilizing the at least one ignore range, at least one tokenization range, and at least one token value, as defined by the at least one signature server. This may then result in a received normalized message, as normalized by the resolving client. The resolving client may then generate a received hash value for the received normalized message, and compare the decrypted hash value with the received hash value. The resolving client may then verify the signed message, wherein if the decrypted hash value and received hash value match, the signed message is verified.

In some further embodiments, the plurality of name servers may further form at least part of a domain name system including the plurality of name servers, the plurality of name servers in communication with each other, wherein the at least one signature server may be an authoritative name server further having been programmed with instructions to receive, from the resolving client, a domain name query, and wherein the message includes an answer to the domain name query. According to various embodiments, the cryptographic signature may be valid for a set of at least two answers to the domain name query. In further embodiments, the at least one signature server may further be programmed with instructions to instantiate a numeric pattern normalization resource record, the numeric pattern normalization resource record further including definitions for the at least one ignore range, at least one tokenization range, and at least one token value. In one set of embodiments, the at least one ignore range may include at least one of an owner ignore field, a left ignore field, and a right ignore field. The owner ignore field further defines the length of characters, counted from a left side of an owner field of the answer to the domain name query, to be included in the at least one ignore range. The left ignore field may further define the length of characters, counted from a left-hand side of a RDATA field of the answer to the domain name query, to be included in the at least one ignore range. The right ignore field may further defines the length of characters, counted from a right-hand side of the RDATA field of the answer to the domain name query, to be included in the at least one ignore range.

In another set of embodiments, the at least one tokenization range and the at least one token value are defined in decimal values. Alternatively, the at least one tokenization range and the at least one token value are defined in hexadecimal values. In some embodiments, at least one of hyphens or periods are treated as numbers to be included in the at least one tokenization range. In further embodiments, the tokenization range may include at least part of a tokenization set, wherein the set of instructions may further include instructions to define each character to be included in the tokenization set individually.

In another aspect, a numeric pattern normalization device is provided. The numeric pattern normalization device may include at least one processor, and non-transitory computer readable media having encoded thereon computer software comprising a set of instructions executable by the at least one processor. This causes the numeric pattern normalization device to generate a message to be transmitted to a resolving client. The numeric pattern normalization device may then normalize the message, via numeric pattern normalization. Numeric pattern normalization may further include defining at least one ignore range within the message, identifying at least part of the message that is within the ignore range, defining an at least one tokenization range indicating which values are to be tokenized, defining at least one token value corresponding to the at least one tokenization range, and replacing all parts of the message, not within the ignore range and having values within the at least one tokenization range, with the at least one token value. Based on the normalized message, the numeric pattern normalization device may generate a hash value. The numeric pattern normalization device may then generate a cryptographic signature, wherein the cryptographic signature includes the hash value encrypted with a private key, wherein the private key has a corresponding public key. With the cryptographic signature, the numeric pattern normalization device may generate a signed message having the message signed with the cryptographic signature, and transmit the signed message to a resolving client.

According to a set of embodiments, the numeric pattern normalization device may include at least part of an authoritative name server of a domain name system, further having been programmed with instructions to receive, from the resolving client, a domain name query, and wherein the message includes an answer to the domain name query. In a further set of embodiments, the set of instructions may further include instructions to instantiate a numeric pattern normalization resource record, the numeric pattern normalization resource record further including definitions for the at least one ignore range, at least one tokenization range, and at least one token value. In a set of embodiments, the at least one ignore range includes an owner ignore field, a left ignore field, and a right ignore field. The owner ignore field may further define the length of characters, counted from a left side of an owner field of the answer to the domain name query, to be included in the at least one ignore range. The left ignore field may further define the length of characters, counted from a left-hand side of a RDATA field of the answer to the domain name query, to be included in the at least one ignore range. The right ignore field may further define the length of characters, counted from a right-hand side of the RDATA field of the answer to the domain name query, to be included in the at least one ignore range.

According to another set of embodiments, the at least one tokenization range and the at least one token value may further be defined in decimal values. Alternatively, the at least one tokenization range and the at least one token value may be defined in hexadecimal values. In some embodiments, at least one of hyphens or periods may treated as numbers to be included in the at least one tokenization range. In further embodiments, the tokenization range may include at least part of a tokenization set, and the set of instructions may further include instructions to define each character to be included in the tokenization set individually.

In another aspect, a method of numeric pattern normalization for cryptographic signatures is provided. The method may include generating, via at least one signature server, a message to be transmitted to a resolving client. The method continues by normalizing, via the at least one signature server, the message, via numeric pattern normalization. The process for numeric pattern normalization may further include defining, at the at least one signature server, at least one ignore range within the message. Based on the at least one ignore range, the method may continue by identifying, via the at least one signature server, at least part of the message that is within the ignore range. The method may further include defining, at the at least one signature server, an at least one tokenization range indicating which values are to be tokenized, and defining, at the at least one signature server, at least one token value corresponding to the at least one tokenization range. Based on the at least one tokenization range and at least one token values, the method may proceed by replacing, via the at least one signature server, all parts of the message, not within the ignore range and having values within the at least one tokenization range, with the at least one token value. The method continues by generating, via the at least one signature server, a hash value for the normalized message, generating, via the at least one signature server, a cryptographic signature, wherein the cryptographic signature comprises the hash value encrypted with a private key, wherein the private key has a corresponding public key, and generating, via the at least one signature server, a signed message including the message signed with the cryptographic signature. The method may then continue by transmitting, via the at least one signature server, the signed message to a resolving client.

According to one set of embodiments, the method may further include steps to verify the signed message. Thus, the method may include receiving, via the resolving client, the signed message having both the cryptographic signature and message, and decrypting, via the resolving client, the cryptographic signature with the public key to yield a decrypted hash value. The method may continue by normalizing, via the resolving client, the message, via numeric pattern recognition, utilizing the at least one ignore range, at least one tokenization range, and at least one token value, as defined by the at least one signature server, resulting in a received normalized message, and generating, via the resolving client, a received hash value for the received normalized message. The method may proceed by comparing, via the resolving client, the decrypted hash value with the received hash value, and verifying, via the resolving client, the signed message, wherein if the decrypted hash value and received hash value match, the signed message may be verified.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
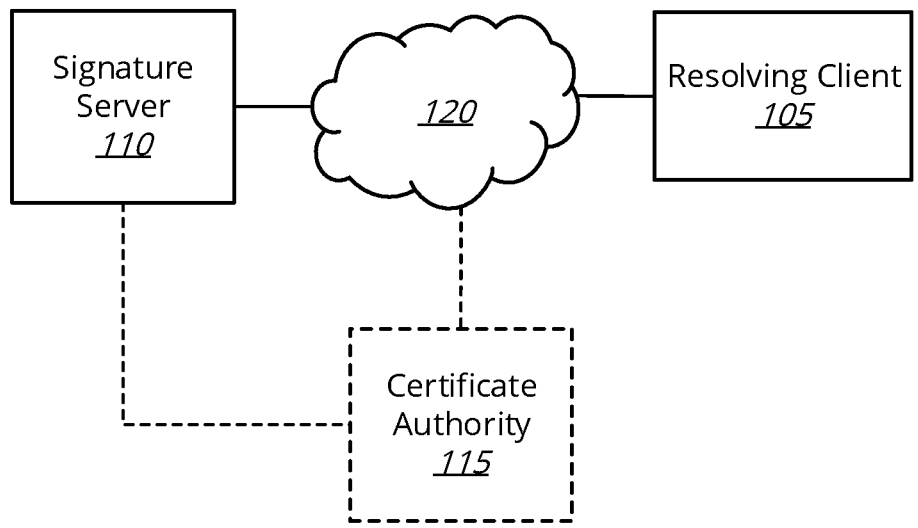
FIG. 1 is a schematic block diagram of a system for numeric pattern normalization for cryptographic signatures, in accordance with various embodiments.

FIG. 1 illustrates a system 100 for numeric pattern normalization for cryptographic signatures, in accordance with various embodiments. The system 100 includes a resolving client 105, signature server 110, and optionally a certificate authority 115. According to various embodiments, the resolving client may be communicatively coupled to the signature server 110 via communications network 120. The signature server 110 may further optionally be in communication with a certificate authority 115. In one set of embodiments, the signature server 110 may have direct access to the certificate authority 115, while in other embodiments the signature server 110 may be in communication with the certificate authority 115 over communications network 120.

In various embodiments, the resolving client 105 may include any recipient end device requesting or receiving a signed message, in which the contents of the signed message have been signed by the sender. Accordingly, the signature server 110 includes any sender device generating and sending the signed message to the resolving client 105. Thus, in various embodiments, the resolving client 105 may include, without limitation, personal computers; mobile devices, such as laptops, smartphones, tablets, and the like; servers; workstations; remote terminals; network devices; virtualized machine instances; or any other device, including hardware, software, or a combination of hardware and software, capable of receiving a signed message. In one set of embodiments, the resolving client 105 may further include an intermediate device forwarding a request for the signed message. For example, the resolving client 105 may include a name server in a DNS querying the signature server 110 for an answer to a DNS query, in the form of a signed answer. Accordingly, in various embodiments, the signature server 110 may include, without limitation, servers, such as name servers, authoritative name servers, root name servers, application server, web server, and the like; a personal computer from the message sender; mobile devices, such as laptops, smartphones, tablets, and the like; a virtual machine; or any other device, including hardware, software, or a combination of hardware and software, capable of generating a signed message.

In various embodiments, the resolving client 105 may thus request and receive signed messages over the communications network 120, and the signature server 110 receive requests for a signed message, and transmit signed messages over communications network 120. Accordingly, the communication network 120 may include, without limitation, both wired and wireless networks; a local area network (LAN), including without limitation a fiber network, or an Ethernet network; a wide-area network (WAN); a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, the Bluetooth protocol, various cellular data standards including worldwide interoperability for microwave access (WiMAX) and long term evolution (LTE), or any other wireless protocol; or any combination of these or other networks capable of supporting cryptographically signed communications.

According to various sets of embodiments, cryptographically signed communications may be generated by the signature server 110. In some embodiments, the cryptographically signed communications may be created in response to a request from the resolving client 105. The signature server 110 may then generate or otherwise obtain a message to be signed. For example, in one set of embodiments, the signature server 110 may be an authoritative name server of a DNS having an answer to a DNS query from the resolving client 105. The resolving client 105 may in turn be a DNS resolver. In other embodiments, the signature server 110 may be a name server of a DNS, which queries other name servers for an answer to a DNS query. Thus, the signature server 110 may retrieve a message to be signed from another device. In other embodiments, a separate device or other server may simply forward a message to be signed to the signature server 110. In such embodiments, the signature server 110 may then be a dedicated server for signing such messages for the message sender. In further embodiments, the signature server 110 may act to sign messages on behalf of one or more different senders.

Once the signature server 110 has generated or otherwise obtained a message to be signed, the signature server 110 may then normalize the message. According to various embodiments, the message may be normalized via numeric pattern normalization (NPN). NPN refers to the process of normalizing numeric, pattern-based content or data of the messages. In various embodiments, NPN may include, without limitation, identifying, within a message, message content that is within a specified ignore range, and message content that is within a tokenization range.

The ignore range may specify parts of a message that should be ignored or excluded from the normalization process, while the tokenization range specify parts of the message that should be included in the normalization process. In one set of embodiments, the ignore range may include a right ignore field, and a left ignore field. The right ignore field may define, for a given DNS RR or set of RRs, the length of characters, as counted from the right-hand side of an RDATA field of an individual RR, which must be ignored by the signature server 110 in the normalization process. Correspondingly, the left hand ignore field may define, for a given DNS RR or set of RRs, the length of characters, as counted from the left-hand side of the RDATA field of a RR, which must be ignored by the signature server 110 in the normalization process. In further embodiments, the ignore range may further specify an owner ignore field, which defines the length of characters, as counted from the left-hand side of the owner field of a RR, which must be ignored by the signature server 110 in the normalization process.

The tokenization range, in turn, may specify, for parts of the message that are not within the ignore range, values which should be included in the normalization process. In various embodiments, the values may include, without limitation, alphanumeric characters, such as letters and numeric digits; special characters, such as punctuation marks, whitespace, and other symbols and language scripts; control characters; numeric values as specified in binary, decimal, and hexadecimal, among other numeral systems. In one set of embodiments, the values may be defined in a flags field. For example, the flags field may be defined as a 1 octet field, where each bit position in the flags field corresponds to a flag for a set of different processing parameter for the normalization process, as will be described in more detail below with reference to FIG. 3. In a further set of embodiments, the tokenization range may correspond to a sequential range of values. In other embodiments, the tokenization range may be defined as a set of values, which may not necessarily include a sequential range of characters.

In various embodiments, the NPN process may then proceed to replace all parts of the message identified as not being within the ignore range and within the tokenization range, with a token value. In various embodiments, one or more token values may be utilized corresponding to one or more different tokenization ranges. For example, if one token value is utilized for all tokenization ranges, all characters within the tokenization range may be replaced by another character defined as the token value. If more than one token value is utilized, a first token value may correspond to a first tokenization range; a second tokenization value may correspond to a second tokenization range; and so on. In yet further embodiments, more than one token value may be assigned to a single tokenization range, or a single token value may be assigned to more than one tokenization range. As with the ignore range and tokenization range, token values may include, without limitation, alphanumeric characters, such as letters and numeric digits; special characters, such as punctuation marks, whitespace, and other symbols and language scripts; control characters; numeric values as specified in binary, decimal, and hexadecimal, among other numeral systems.

In this manner, the signature server 110 may normalize parts of the message determined not to be within the ignore range, but within the tokenization range, by replacing the message contents with token value. For example, in one set of embodiments, a left ignore field may be defined as 4 characters long, a right ignore field may be defined as 13 characters long, and the tokenization range may cover 0-9, a-f corresponding to hexadecimal numerals. The token value may be defined as "f." Given a message having a message content in the following format:

ABC.[0-f]-[0-f].EXAMPLE.NET.

A normalized output may be expected to follow the format:

ABC.f-f.EXAMPLE.NET.

In a first example, the content of the message may include a plain-text input: ABC.12-cc.EXAMPLE.NET. For purposes of illustration, this may be visualized as follows:

```
              1 1 1 1 1  1   1   1   1   1   2   2 2   2   2   2 2
0 1 2 3 4  5  6  7 8 9 0 1 2 3 4  5   6   7   8   9   0   1 2   3   4   5 6
                         v------------
           A  B  C  . 1 2 - c c . E   X   A   M   P   L   E . N   E   T   .
                             ------------^
2 2 2 2 2  2  2  1 1 1 1 1 1 1 1  1   1
6 5 4 3 2  1  0  9 8 7 6 5 4 3 2  1   0   9   8   7   6   5 4   3   2   1 0
```

Given the left ignore field of 4 characters, "ABC." may be ignored from the normalization process. Similarly, given a right ignore field of 13 characters, ".EXAMPLE.NET." may also be ignored from the normalization process. Thus, only "12-cc" are not included within the ignore range. The tokenization range is defined as including all characters in the space of 0-9, a-f, corresponding to hexadecimal numerals, with a token value of "f." Accordingly, in one set of embodiments, "12-cc" may be normalized as "f-f." In this case, each run of characters within the tokenization range may be normalized to a single "f." As the hyphen "-" character is not defined within the tokenization range, the hyphen character remains intact. In this way, both "12" and "cc" becomes normalized to just "f." The normalization process then results in the normalized output: ABC.f-f.EXAMPLE.NET. This matches the format of the expected normalized output, and the normalized output may be considered a successful normalization.

In a second example, the message may this time have a plain-text input: ABC.9876-abcd.EXAMPLE.NET. For purposes of illustration, this may be visualized as follows:

```
                 1 1 1 1 1 1  1   1   1   1   2   2 2   2   2   2 2
0  1  2  3  4 5 6 7 8 9 0 1 2 3 4  5   6   7   8   9   0   1 2   3   4   5 6
                  v--------------------
A  B  C  . 9 8 7 6 - a b c d . E   X   A   M   P   L   E . N   E   T   .
                      --------------------^
2  2  2  2 2 2 2 1 1 1 1 1 1 1 1  1   1
6  5  4  3 2 1 0 9 8 7 6 5 4 3 2  1   0   9   8   7   6   5 4   3   2   1 0
```

Similar to the first example, given the left ignore field of 4 characters, "ABC." may be ignored from the normalization process. Given the right ignore field of 13 characters, ".EXAMPLE.NET." may also be ignored from the normalization process. Thus, only "9876-abcd" are not included within the ignore range. The tokenization range is defined as including all characters in the space of 0-9, a-f, corresponding to hexadecimal numerals, with a token value of "f." Accordingly, in one set of embodiments, "9876-abcd" may be normalized once again as "f-f." Again, each run of characters within the tokenization range may be normalized to a single "f." In this way, both "9876" and "abcd" may be normalized to just "f." The normalization process then results in the normalized output: ABC.f-f.EXAMPLE.NET. This matches the format of the expected normalized output, and the normalized output may again be considered a successful normalization.

A third example provides a plain-text input: ABC.9876-abcd.BADGUY.NET. For purposes of illustration, this may be visualized as follows:

```
                 1 1 1 1 1 1  1   1   1   1   2   2 2   2   2   2 2
0  1  2  3  4 5 6 7 8 9 0 1 2 3 4  5   6   7   8   9   0   1 2   3   4   5 6
                  v--------------------
A  B  C  . 9 8 7 6 - a b c d . B   A   D   G   U   Y   . N   E   T   .
                      --------------------^
2  2  2  2 2 2 2 1 1 1 1 1 1 1 1  1   1
6  5  4  3 2 1 0 9 8 7 6 5 4 3 2  1   0   9   8   7   6   5 4   3   2   1 0
```

As in the first two example, given the left ignore field of 4 characters, "ABC." may be ignored from the normalization process. However, given the right ignore field of 13 characters, the right hand ignore field includes all of "d.BADGUY.NET." Thus, only "9876-abc" are not included within the ignore range. Accordingly, in one set of embodiments, only "9876-abc" may be normalized once as "f-f." The normalization process then results in the normalized output: ABC.f-fd.BADGUY.NET. The normalized output does not match the format of the expected normalized output, and the normalized output may fail at the normalization step, or otherwise fail subsequent verification by the resolving client 105.

A fourth example is provided, having a plain text input with a character not included within the tokenization range. The message in the fourth example may provide a plain text input: ABC.9876-abcz.EXAMPLE.NET. For purposes of illustration, this may be visualized as follows:

```
                    1 1 1 1 1 1 1 1 1 1 1 2 2 2 2 2 2 2
0 1 2 3 4 5 6 7 8 9 0 1 2 3 4 5 6 7 8 9 0 1 2 3 4 5 6
        v-------------------
A B C . 9 8 7 6 - a b c z . E X A M P L E . N E T .
        -------------------
2 2 2 2 2 2 2 1 1 1 1 1 1 1 1 1 1
6 5 4 3 2 1 0 9 8 7 6 5 4 3 2 1 0 9 8 7 6 5 4 3 2 1 0
```

This time, as in the previous examples, the left-hand side "ABC." and right-hand side ".EXAMPLE.NET." may be ignored from the normalization process. However, given a tokenization range that only includes hexadecimal values, "9876-abc" will be included for normalization and replacement with the token value, resulting in a normalized output: ABC.f-fz.EXAMPLE.NET. Again, because the normalized output does not match the format of the expected normalized output, the normalized output may be failed at the normalization step or otherwise fail subsequent verification by the resolving client 105.

It is to be understood that while various examples of the normalization process have been provided above for illustrative purposes, these examples should not be considered limiting in any way.

According to various sets of embodiments, once the NPN normalization process is completed and a normalized message is produced, the signature server 110 may proceed to generate a hash value for the normalized message. In one set of embodiments, the signature server 110 may utilize a hash function, as known to those skilled in the art, to arrive at the hash value.

In various embodiments, the hash value may then be encrypted, by the signature server 110, with a message sender's private key. The message sender's private key may be issued to the signature server 110, or issued to a customer who then provides the private key to the signature server 110. In some embodiments, each signature server may include a set of one or more private keys for each respective sender. Thus, based on the sender of the message, the signature server may select a private key from the set of one or more private keys corresponding to the message's respective sender. The encrypted hash value then serves as the cryptographic signature. In various further embodiments, the signature server 110 may be in contact with a certificate authority 115, entrusted to create and issue a public and private key-pair to signature server 110, or to the message sender. In this manner, a signed message may be created including at least the message itself, in pre-normalized form; and the cryptographic signature, having the private-key encrypted hash value. The signed message may then be transmitted to the resolving client 105.

In various embodiments, the signature server 110 may be programmed to receive pre-defined normalization parameters, including, but not limited to, an ignore range, tokenization range, token values, or a match type field. In other embodiments, the signature server 110 may be programmed to receive input from a user defining the normalization parameters. In one set of embodiments, customers or subscribers may be able to define their own normalization parameters respectively for their own signed messages. In other embodiments, only the owner of the signature server 110—such as a service provider, owner of a domain name, resource record, DNS zone, or a DNS root name server—may be permitted to define normalization parameters for the signature server 110.

In various embodiments, the NPN process may take place in hardware, software, or a combination of both. For example, the signature server 110 may utilize software to complete at least part of the NPN process. In some embodiments, the signature server 110 may instead utilize dedicated hardware encoders to complete at least part of the NPN process. In one set of embodiments, the ignore range and tokenization range may be defined as part of a DNS RR, such as an NPN RR described below. In various embodiments, the NPN RR may include, without limitation, a match type field, time to live (TTL) field, the left ignore field, right ignore field, owner ignore field, and flags field. Thus, the NPN RR may have defined, in itself, an ignore range, tokenization range, and token values for a given DNS RR or set of RRs. In other embodiments, the NPN process may implemented on the signature server 110 as part of an application or service.

In various embodiments, once the signed message is received by the resolving client 105, the resolving client 105 may extract both the message, in its non-normalized form, and the cryptographic signature. The resolving client 105 may then decrypt the cryptographic signature with the corresponding public key. In various embodiments, the resolving client 105 may obtain the public key from the certificate authority 115. Once decrypted, the resolving client 105 will have the hash value for the normalized message.

The resolving client 105 may then, similar to the signature server 110, perform NPN processing on the received message, to produce a normalized received message. The resolving client 105 may then generate a hash value for the normalized received message. The hash value, obtained from the cryptographic signature, and the hash value, generated from the normalized received message, may then be compared by the resolving client 105. If the hash values match, the resolving client 105 can confirm that the signed message has been verified to have originated from the sender, and that the contents of the message have not been altered. If the hash values do not match, the resolving client 105 can determine that either the message contents have been altered, or that the public key used to decrypt the cryptographic signature does not match the private key used by the signature server 110 to encrypt the hash value of the normalized message.

Figure 2:
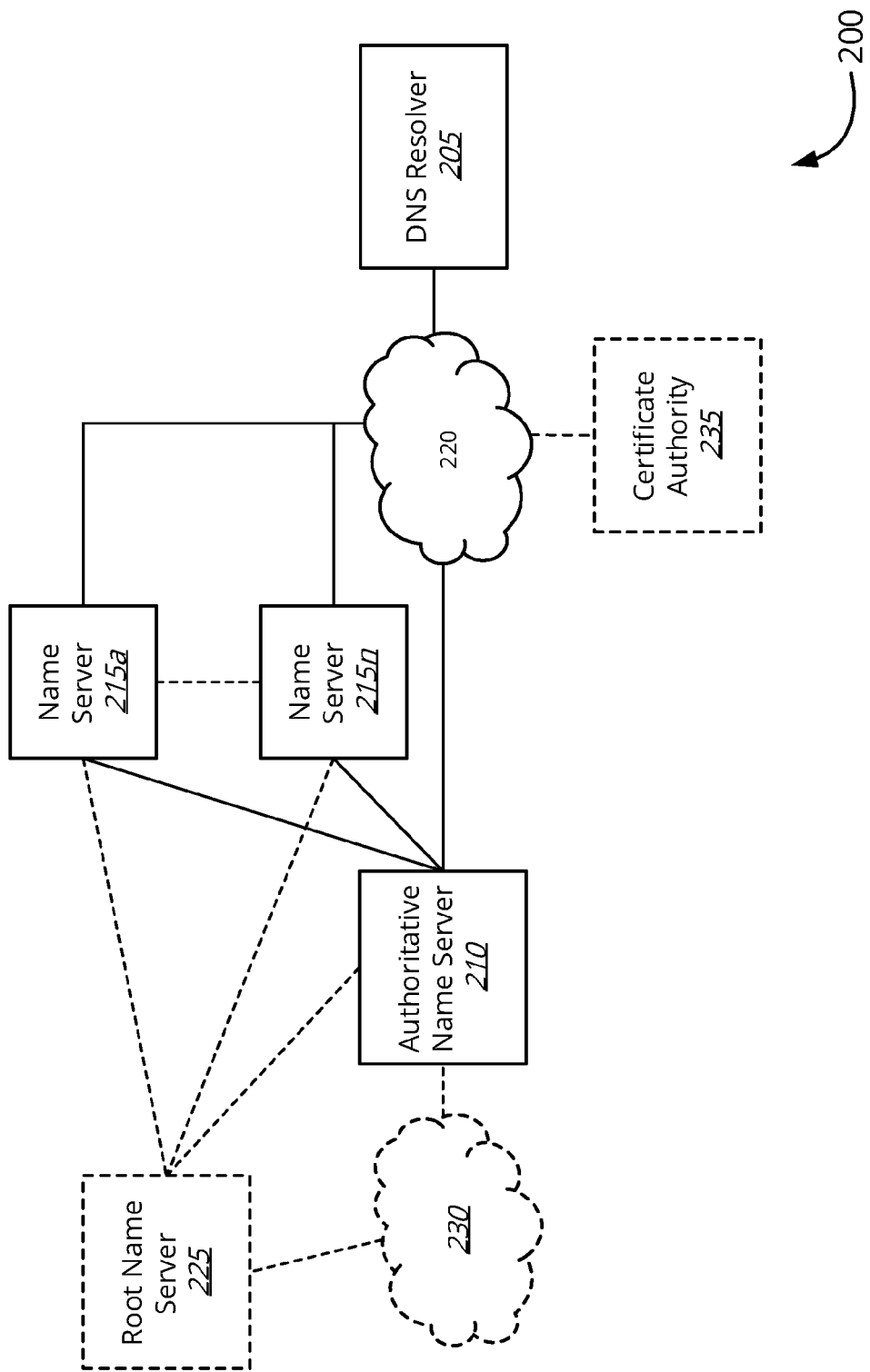
FIG. 2 is a schematic diagram of a domain name system, in accordance with various embodiments.

Accordingly, in various embodiments, the signature server 110 and resolving client 105 may be a dedicated device or a software component included as part of the signature server 110. For example, the signature server 110 and resolving client 105 may be implemented as hardware or software, a computer system such as a personal computer, a server computer, a dedicated hardware component such as an encryption card, a virtual machine, or other suitable designs. In various embodiments, the signature server 110, resolving client 105, or certificate authority 115, may be implemented as part of a system on a chip (SoC), application specific integrated circuit (ASIC), field programmable gate array (FPGA), or other similarly programmable embedded system. Correspondingly, the signature server 110 may include computer hardware, such as, without limitation, a microprocessor, system storage, system memory, and other non-transitory computer readable media. The non-transitory computer readable media may in turn be encoded with software instructions allowing the signature server 110 to perform NPN processing, as will be discussed in more detail with respect to FIG. 7 below FIG. 2 illustrates a schematic diagram of a domain name system 200, according to various embodiments. The system 200 may implement a DNSSEC and include a DNS resolver 205, a DNSSEC enabled authoritative name server 210, a plurality of DNSSEC-aware name servers 215a-215n (215 collectively), network 220, root name server 225, network 230, and certificate authority 235. In various embodiments, the DNS resolver 205 may be connected to the plurality of name servers 215, or alternatively, to the authoritative name server 210, via network 220. Each of the plurality of name servers may be communicatively coupled to each other, and further to a root name server 225 and the authoritative name server 210. The authoritative name server 210, in turn, may also optionally be coupled to the root name server 225, via network 230, and optionally to a certificate authority 235, via network 220.

In various embodiments, as discussed in FIG. 1, the DNS resolver 205 includes the client-side of a DNS. The DNS resolver may include hardware, software, or a combination of both hardware and software. For example, in one set of embodiments, the DNS resolver may be a software service running on a client device's internet browser, or otherwise implemented as software on the client device. In various embodiments, the DNS resolver 205 may generate DNS queries for a name server to answer, in response to which the name server may provide a message that includes the answer to the DNS query. In some further embodiments, the DNS resolver 205 may further include a local DNS cache, which it may first check against to resolve its own query. However, in various embodiments, the DNS resolver 205 may generate a DNS query to be sent to one of the plurality of name servers 215, or the authoritative name server 210.

In various embodiments, the plurality of name servers 215 may include one or more recursive name servers. Recursive name servers 215 may receive a DNS query from the DNS resolver 205, which the recursive name server will then attempt to answer. If a recursive name server 215 does not have an answer to the DNS query, the recursive name server may then query other recursive name servers as necessary until an answer is determined. For example, in one set of embodiments, the recursive name server 215 may optionally query the root name server 225 for an address to authoritative name server 210. The authoritative name server 210 may then receive the query from the recursive server 215, to provide an answer to the DNS query. In various embodiments, answers (i.e. messages) to the DNS query, whether stored on the cache of a recursive name server 215, or provided by the authoritative name server 210, may be cryptographically signed by the authoritative name server 210 to assure that the answer, for example a DNSSEC compatible RRset, has not been altered. In some sets of embodiments, the sender's signature may originate from a domain name's owner, or alternatively from a DNS service provider, including without limitation, an internet service provider.

Accordingly, similar to the network 120 of FIG. 1, network 220 may include, without limitation, any of a LAN or WAN, which further includes, without limitation, a service provider network, a customer's home network, a backbone network, the internet or the like. Similarly, network 230 may include, without limitation, a service provider LAN, a service provider network, a backbone network, or the Internet, through which a root name server 225 or authoritative name server 210 may be reached.

In one set of embodiments, the DNS resolver 205 may submit a DNS query to name servers 215, or alternatively, directly to authoritative name server 210. Once the DNS query is received by the authoritative name server 210, from either the name server 215 or DNS resolver 205, the authoritative name server 210 may perform NPN processing before providing a signed message in response to the DNS query.

According to a set of embodiments, the authoritative name server 210 may be a DNSSEC enabled name server, as described with respect to the disclosures of U.S. Provisional Patent Application Ser. No. 62/185,221 [hereinafter '221 application]. According to various embodiments, the NPN normalization process provides a significant modification to DNSSEC RRset signing and verification. In various embodiments, the normalization parameters may be defined as part of an NPN RR, as described in more detail below, with respect to FIG. 3. Prior to processing into canonical form, signed zones may contain associated RRs where owner, class, and type of a non-NPN RR directly corresponds with an NPN RR matching owner, class and match type. If this condition exists, the NPN RR's RDATA may define details for processing NPN normalization of the associated RDATA, resulting in a normalized output. Normalized data may be based on pre-canonical formatting and zero padded for "A" and "AAAA" RR types for acceptable precision during the process.

In one set of embodiments, rules for this normalization may be defined in the NPN RR. For example, an owner ignore field of the NPN RR may define the length of characters from the beginning of the RR's owner field, or the final string of characters belonging to the zone's origin, that should be ignored or excluded from the normalization process. For an RR's RDATA field, the left ignore field defines a length of characters, as measured from the left-hand side of the RDATA field, to be ignored by the normalization process. Similarly, the right ignore field defines a length of characters, as measured from the right-hand side of the RDATA field, to be ignored in the normalization process. In the remaining portions of the OWNER and RDATA fields, strings of data, as defined in a tokenization range—in this case in the flags field of the NPN RR—may be consolidated to a single token value. In one set of embodiments, this may be a single character set to the highest value defined by the hexadecimal flag of the flags field. Other flags may include, without limitation, a period-as-number or hyphen-as-number flags, which indicate whether to include periods and hyphens in the tokenization range.

The authoritative name server 210 may then process NPN normalization, based on an NPN RR, to normalize the RDATA of a RR, and generate DNSSEC signatures for the RR. In one set of embodiments, the NPN normalization may be processed according to the pseudocode provided below. The pseudocode assumes all associated RRs are valid members of a DNSSEC compatible RRset, including BULK RRs as defined in the disclosures of the '221 application.

```
for rr in rrset
    if (has_ NPN<rr.owner, rr.class, rr.type>)
        rr.rdata_normal = NPN_normalize<rr.rdata>
        add_to_sigrrset<NPN.owner, rr.class, rr.type,
            rr.rdata_normal>
        next
    else
        add_to_sigrrset<rr.owner, rr.class, rr.type, rr.rdata>
        next
```

In various embodiments, similar logic may be enforced for determining DNSSEC validity of RRsets in verification (validation) name servers for signatures generated based on NPN normalization.

According to these embodiments, a first example for NPN normalization processing may begin with a DNS query from DNS resolver 205. The DNS query may be for a pointer (PTR) RR for "10.2.3.44" with an origin of "2.10.in-addr.arpa." The BULK RR and NPN RR may be defined as:

```
-.2.10.in-addr.arpa. 86400 IN BULK PTR (
                        [0-255].[0-10]
                        pool-A-${1}-${2}.example.com.
                        )
*.2.10.in-addr.arpa. 86400 IN NPN PTR 9 0 7 13
```

In this example, as described in the '221 application, the DNS query for "10.2.3.44" may enter the name server with an owner of "44.3.2.10.in-addr.arpa." and a "PTR" RR with data RDATA of "pool-A-3-44.example.com." may be generated.

Accordingly, the NPN RR defines a right ignore field of 13 characters, a left ignore field of 7 characters, an owner ignore field of 0, and a tokenization range as defined in the flags field of 0-9. By protecting the content of the message in the ignore range from the generated RR's RDATA, the focus for normalization becomes "3-44" as depicted below.

```
                    1 1 1 1 1   1 1 1 1 2 2   2 2 2 2
0 1 2 3 4   5 6 7 8 9 0 1 2 3 4   5 6 7 8 9 0 1   2 3 4 5 6
            v---------------
    p o l - A - 3 - 4 4 . e x a   m p l e . c o m .
            ---------------^
2 2 2 2 2 2 2   1 1 1 1 1 1 1 1 1   1
6 5 4 3 2 1 0   9 8 7 6 5 4 3 2 1   0 9 8 7 6 5 4   3 2 1 0
```

Accordingly, as in the examples above, everything to the left of "3-44" remains intact, as does everything to its right. The remaining characters may be processed for values between 0-9. Each string of characters within this tokenization range may be reduced to a single character "9."

The normalized RDATA would then become "pool-A-9-9.example.com." and a cryptographic signature may be based on the normalized RDATA field. The normalized RDATA may be used as the RDATA field in a wildcard label of "*.2.10.in-addr.arpa." encompassing all possible permutations of the "pool-A-${1}-${2}.example.com." pattern. Because the verification (validation) name server uses an identical NPN record for processing and comparison, all RRs generated by the BULK RR can now be verified with a single cryptographic signature, which may be referred to as a wildcard signature.

In a second example, embodiments may call for a classless IPv4 delegation on the /22 CIDR boundary. The network may be defined as "10.2.0/22" delegated to a name server "ns1.sub.example.com.". RRs for this example may be defined as:

```
$ORIGIN 2.10.in-addr.arpa.
0-3     86400   IN      NS       ns1.sub.example.com.
-       86400   BULK    CNAME    [0-255].[0-3] ${*|.}.0-3
*       86400   NPN     CNAME    9 0 0 23
```

In this example, a query of "10.2.2.65" may enter the name server as "65.2.2.10.in-addr.arpa." and a canonical name (CNAME) RR with RDATA of "65.2.0-3.2.10.in-addr.arpa." would be generated.

Accordingly, the NPN RR defines a right ignore field of 23 characters, a left ignore field of 0 characters, an owner ignore field of 0, and a tokenization range as defined in the flags field of 0-9. By protecting the content of the message in the ignore range from the generated RR's RDATA, the focus for normalization becomes "65.2" as depicted below.

```
                1 1 1 1 1 1 1 1 1 1 2 2 2 2 2 2 2 2 2 2
0   1 2 3 4 5 6 7 8 9 0 1 2 3 4 5 6 7 8 9 0 1 2 3 4 5 6 7 8 9
v----------
    6 5 . 2 . 0 - 3 . 2 . 1 0 . i n - a d r . a r p a .
----------^
2   2 2 2 2 2 2 2 2 1 1 1 1 1 1 1 1 1 1
9   8 7 6 5 4 3 2 1 0 9 8 7 6 5 4 3 2 1 0 9 8 7 6 5 4 3 2 1 0
```

Thus, everything to the left of the "65.2" remains intact, as does everything to its right. The remaining characters may be processed for values between 0-9. Each string of characters within this tokenization range may be reduced to a single character "9."

The normalized RDATA would then become "9.9.0-3.2.10.in-addr.arpa." and a cryptographic signature may be based on the normalized RDATA field. The normalized RDATA may be used as the RDATA field in a wildcard label of "*.2.10.in-addr.arpa." encompassing all possible permutations of "${*1.}.0-3.2.10.in-addr.arpa." pattern.

Embodiments according to a third example provide reverse logic for the first example above, by returning an IPv4 A-type RR for a requested host name. The DNS query may be defined as an A record for "pool-A-3-44.example.com." with an origin of "example.com.". RRs for this example may be defined as:

```
-.example.com. 86400 IN BULK A (
                        pool-A-[0-10]-[0-255]
                        10.2.${*}
                        )
*.example.com. 86400 IN NPN A 9 0 8 0
```

Accordingly, the NPN RR defines a right ignore field of 0 characters, a left ignore field of 8 characters, an owner ignore field of 0, and a tokenization range as defined in the flags field of 0-9. By protecting the content of the message in the ignore range from the generated RR's RDATA, the focus for normalization becomes "003.044" as depicted below.

```
                        1 1 1 1 1 1 1 1 1 1
    0 1 2 3 4 5 6 7 8 9 0 1 2 3 4 5 6 7 8
                        v---------------
      0 1 0 . 0 0 2 . 0 0 3 . 0 4 4
                                       ^
                                       ---------------
1 1 1 1 1 1 1 1 1
8 7 6 5 4 3 2 1 0 9 8 7 6 5 4 3 2 1 0
```

Because NPN records are pre-canonical they, in some embodiments, NPN records operate on a strict subset of WIRE formatted data. For "A" and "AAAA" records this means the ignore fields may be based on zero padded data. In this example, the record may be converted into "010.002.003.044", as depicted above, prior to normalization processing. After processing, wire format would become "0x0A02032C" (shown in hexadecimal). In some situations, this may be too imprecise for normalization, and padded decimal may be used instead.

Accordingly, everything to the left of the "003.044" remains intact, as does everything to its right. The remaining characters may be processed for values between 0-9. Each string of characters within this tokenization range may be reduced to a single character "9."

The normalized RDATA would then become "10.2.9.9" and a cryptographic signature may be based on the normalized RDATA field. The normalized "A" RR may be used as the RDATA field in a wildcard label of "*.example.com." encompassing all possible permutations of "10.2.${*}" pattern.

A fourth example of these embodiments provides similar logic for an IPv6 AAAA record. In this example, the query may be defined as an "AAAA" record for "pool-A-ff-aa.example.com." with an origin of "example.com.". RRs for this example may be defined as:

```
-.example.com.  86400 IN BULK AAAA (
                     pool-A-[0-ffff]-[0-ffff]
                     fc00::${1}:${2}
                     )
*.example.com.  86400 IN NPN AAAA X 0 30 0
```

Accordingly, the NPN RR defines a right ignore field of 0 characters, a left ignore field of 30 characters, an owner ignore field of 0, and a tokenization range as defined in the flags field of 0-9, a-f. By protecting the content of the message in the ignore range from the generated RR's RDATA, the focus for normalization becomes "00ff:00aa" as depicted below.

```
                          1 1 1 1 1 1 1 1 1 1 2 2
0 1 2 3 4 5 6 7 8 9 0 1 2 3 4 5 6 7 8 9 0 1
  f c 0 0 :   0 0 0 0 :   0 0 0 0 :   0 0 0 0 :   -/-/
4 3 3 3 3 3   3 3 3 3     2 2 2 2     2 2 2 2     1
0 9 8 7 6 5   4 3 2 1     0 9 8 7     6 5 4 3 2 1 0 9
/-/-/ . . .                                         -/-/-/
        2 2 2 2   2 2 2 2   3 3 3 3   3 3 3 3 3 3   4
        1 2 3 4   5 6 7 8   9 0 1 2   3 4 5 6 7 8 9 0
                              v-----------------
/-/- 0 0 0 0 :   0 0 0 0 :   0 0 f :   0 0 a a
                                                ^
                                                -----------------
2 1 1 1 1   1 1 1 1 1
0 9 8 7 6   5 4 3 2 1 0 9 8 7 6 5 4 3 2 1 0
```

As explained previously, because NPN records are pre-canonical they, in some embodiments, NPN records operate on a strict subset of WIRE formatted data. For "A" and "AAAA" records this means the ignore fields may be based on zero padded data. In this example, the record may be converted into "fc00:0000:0000:0000:0000:0000:00ff:00aa", as depicted above, prior to normalization processing. After processing, wire format would become "0xFC00000000000000000000000000FF00AA" (shown in hexadecimal). This amounts to 16 bytes of WIRE data, which in some embodiments, may be too imprecise for normalization. Therefore, padded hexadecimal may be used instead.

Accordingly, everything to the left of the "00ff:00aa" remains intact, as does everything to its right. The remaining characters may be processed for values between 0-9, a-f. Each string of characters within this tokenization range may be reduced to a single character "f."

The normalized RDATA would then become "fc00::f:f" and a cryptographic signature may be based on the normalized RDATA field. The normalized "AAAA" RR may be used as the RDATA field in a wildcard label of "*.example.com." encompassing all possible permutations of the "fc00::${1}:${2}" pattern.

In this manner, the authoritative may utilize sign multiple answers with a single wildcard cryptographic signature. As in previous examples, it is to be understood that while various examples of the normalization process have been provided above for illustrative purposes, these examples should not be considered limiting in any way.

In various embodiments, once the signed message is received by the DNS resolver 205, DNS resolver 205 may extract both the message, in its non-normalized form, and the cryptographic signature. The DNS resolver 205 may then decrypt the cryptographic signature with the corresponding public key. Once decrypted, the DNS resolver 205 will have the hash value for the normalized message.

In various embodiments, the DNS resolver 205 may then perform NPN processing on the received message, to produce a normalized received message. The DNS resolver may then generate a hash value for the normalized received message. The hash value, obtained from the cryptographic signature, and the hash value, generated from the normalized received message, may then be compared by the DNS resolver 205. If the hash values do not match, the DNS resolver 205 may fail verification for the signed message. If the hash values do match, the DNS resolver 205 may pass verification for the signed message.

Figure 3:
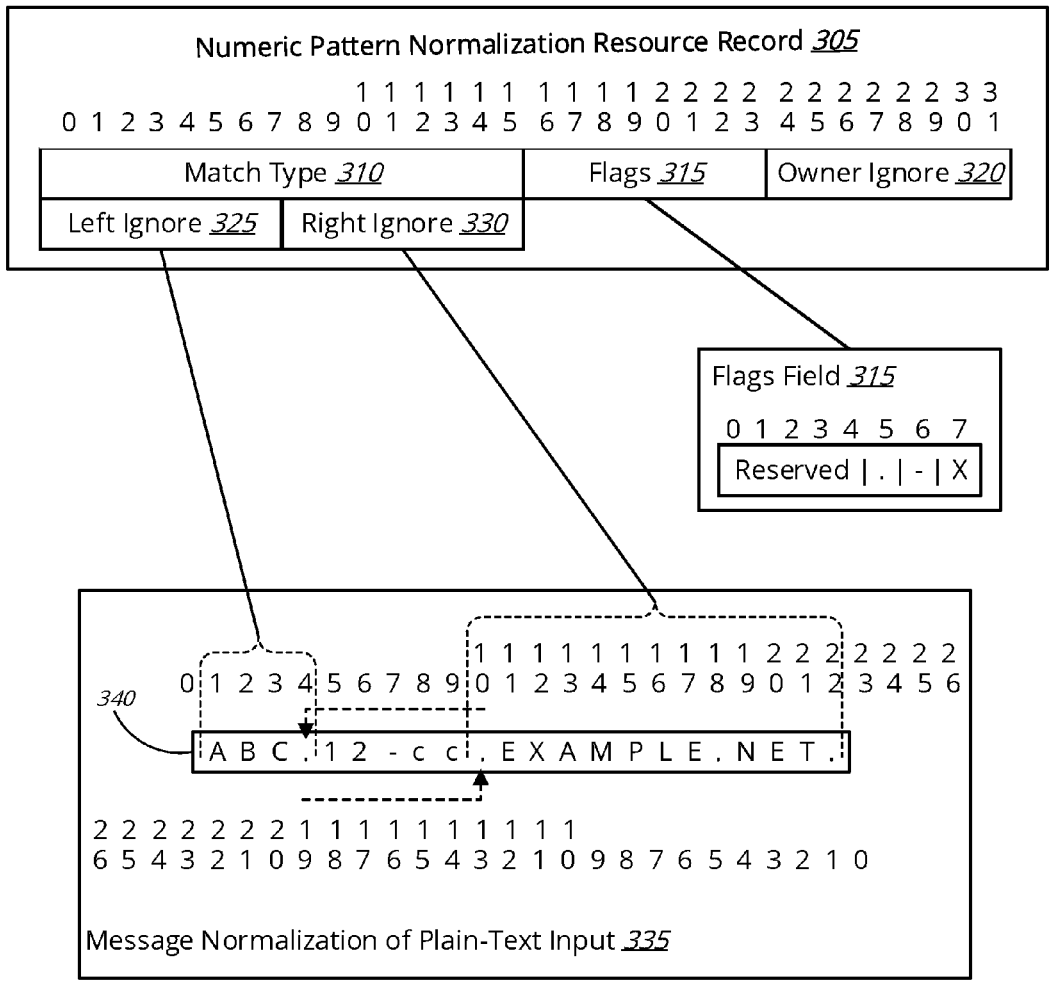
FIG. 3 is a schematic diagram of a numeric pattern normalization resource record, in accordance with various embodiments.

FIG. 3 illustrates a schematic diagram 300 of an NPN RR 305, in accordance with various embodiments. In one set of embodiments, the NPN RR 305 may include, without limitation, a match type field 310, a flags field 315, owner ignore field 320, left ignore field 325 and right ignore field 330. The match type field 310 may identify the type of RRset identified by a particular NPN resource record.

In various embodiments, each RRset may be identified by an RR type mnemonic, or type value. The flags field 315 may define a set of one or more processing parameter for the normalization process. In one set of embodiments, the flags field may be a 1 octet long field, having eight bits corresponding to numbered positions. In some embodiments, only three of the positions may be defined: a period-as-number flag for the "." character corresponding to bit 5, a hyphen-as-number flag for the "-" character corresponding to bit 6, and a hexadecimal flag shown as "X" corresponding to bit 7. Bits 0-4 may be reserved for future use. According to various embodiments, reserved bits 0-4 may have no default value if set to false (0). Bit 5, the period-as-number flag, when set, indicates that the period will be processed as a number. The flag may have no default value if set to false (0). Bit 6, the hyphen-as-number flag, when set, indicates that the hyphen will be processed as a number. This flag will similarly have no default value when set to false (0). Bit 7 is the hexadecimal flag, which when set, indicates that the tokenization range will include, as its highest value "f," and include hexadecimal numerals from 0-9, a-f. The hexadecimal flag may have a default value of "9" when set to false (0).

In further sets of embodiments, the owner ignore field 320 may define the length of characters, as counted from the left-hand side of the owner field of the RR in question, which to be excluded from the normalization process. In one set of embodiments, the owner ignore field 320 may be a single octet field. The left ignore field 325 may define the length of characters, as counted from the left-hand side of the generated RDATA to be excluded from the normalization process. The left ignore field 325 is represented in relation to the plain-text input 335 of generated RDATA 340. Thus, in one set of embodiments, the left ignore field 325 may specify that four characters are to be ignored, as counted from the left hand side: "ABC.". In one set of embodiments, the left ignore field 325 may be a single octet field. The right ignore field 330, then, defines the length of characters as counted from the right-hand side of the generated RDATA to be excluded from the normalization process. The right ignore field 330 is represented in relation to the generated RDATA 340 as encompassing ".EXAMPLE.NET.". Accordingly, in this embodiment, the right ignore field 330 may specify that thirteen characters should be ignored by the normalization process. In one set of embodiments, the right ignore field 330 may be a single octet field.

According to a set of embodiments, the match type field 310 may be defined to be represented as an RR type mnemonic. If the mnemonic is not known, the match type field 310 may further be defined to utilize a TYPE representation. Similarly, in some embodiments, the flags field 315 may be defined such that the flags field 315 are represented as a string of characters representing each flag bit. If all bits were set to "0," the default value for the flags field 315 may be presented. In the embodiments described above where the default value of the hexadecimal flag "X" is defined as "9," the default value for the flags field would be presented as "9" if all bits in the flags field 315 were set to "0." In a set of further embodiments, the NPN RR may be defined to require that each of owner ignore 320, left ignore 325, and right ignore 330, to be presented as unsigned decimal integers that fall within the range of values 0-255, as available in a single octet, 8 bits in length.

Figure 4:
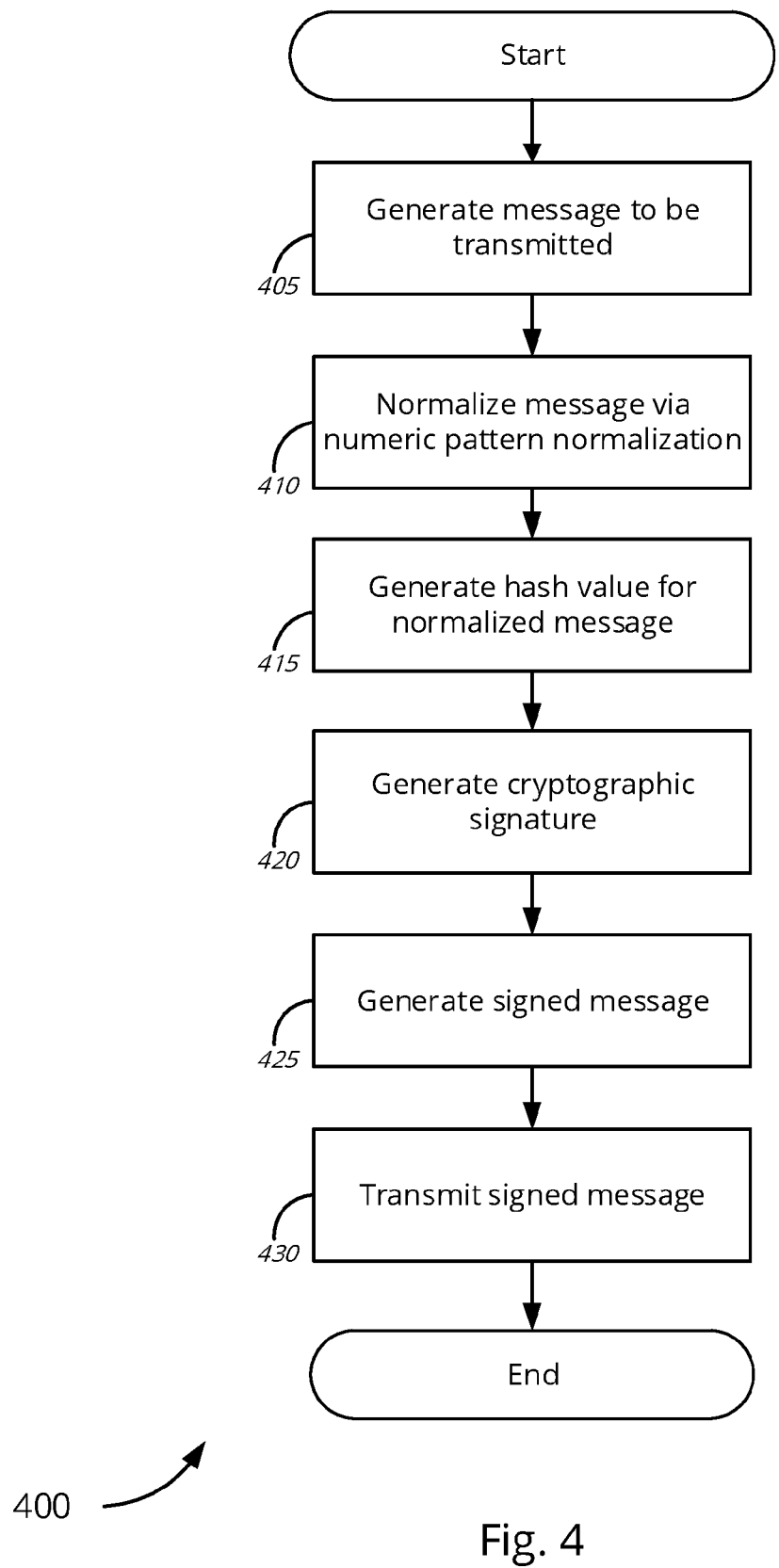
FIG. 4 is a flow diagram of cryptographically signing a message with numeric pattern normalization, in accordance with various embodiments.

FIG. 4 illustrates a flow diagram of a method 400 for, in accordance with various embodiments. The method 400 begins at block 405, by generating, via an at least one signature server, a message to be transmitted to a resolving client. In various embodiments, the message may include any data, text, or information to be signed with a cryptographic signature. For example, in one set of embodiments, the message may be an answer to a DNS query from the resolving client. In some embodiments, the signature server may generate the message itself, whether as received input from the sender, or as retrieved from local storage, such as a local DNS cache file. In other embodiments, the signature server may obtain the message from a different device.

The method 400 continues, at block 410, by normalizing, via the at least one signature server, the message via numeric pattern normalization. In various embodiments, the signature server may obtain pre-defined normalization parameters, including, without limitation, an ignore range, a tokenization range, and a token value. In other embodiments, the signature server may be programmed to receive input from a user defining normalization parameters, such as the ignore range, tokenization range, and tokenization value. The details of the normalization process are described in further detail with respect to FIG. 5.

At block 415, the signature server generates a hash value for the normalized message. In various embodiments, the signature server may process the normalized message through a hash function, as known to those skilled in the art, to obtain the hash value.

At block 420, the signature server generates a cryptographic signature, based on the hash value. In various embodiments, the hash value may be encrypted using public-key cryptography. The signature server may use its private key, or a private key of the sender, to encrypt the hash value. In various embodiments, the encrypted hash value then serves as the sender's cryptographic signature. In one set of embodiments, the signature server may rely on a certificate authority to issue it a public and private key-pair.

At block 425, the signature server generates a signed message, which includes the message, before normalization, and the cryptographic signature. In various embodiments, the signed message may then be unpacked by the recipient to obtain both the message and cryptographic signature. Thus, the contents of a cryptographically signed message may not be secure, and others may view the message. However, the cryptographic signature assures the recipient of message integrity, provides nonrepudiation, and assures that the contents have been tampered during transmittal.

At block 430, the signature server transmits the signed message to a resolving client device. As discussed above, in various embodiments, the signature server may transmit the signed message through an intermediate device, such as a recursive name server, or transmit the message directly to the recipient.

Figure 5:
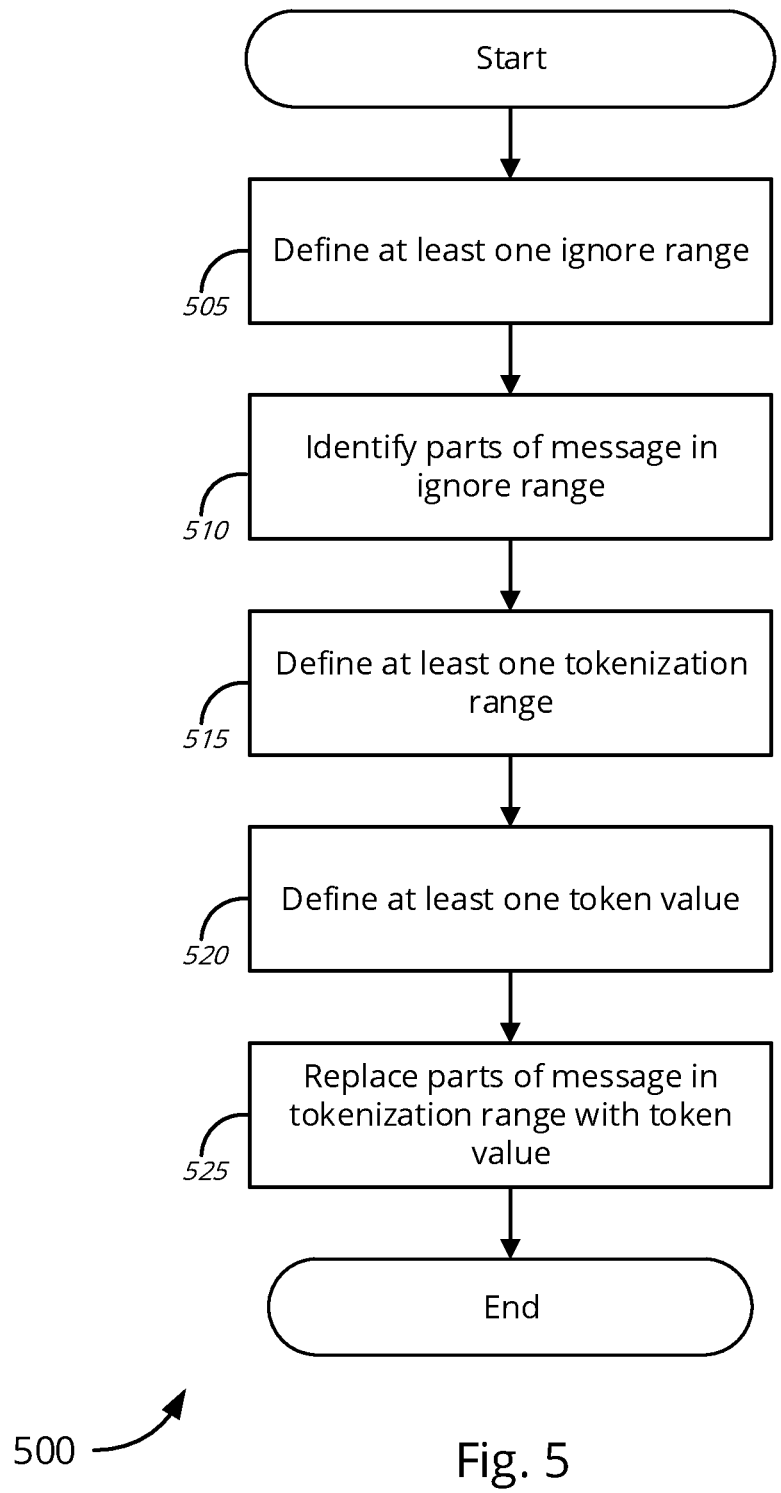
FIG. 5 is a flow diagram of numeric pattern normalization in cryptographic signature generation, in accordance with various embodiments.

FIG. 5 illustrates a flow diagram of a method 500 of numeric pattern normalization in cryptographic signature generation, in accordance with various embodiments. The method 500 begins, at block 505, by defining an at least one ignore range. In various embodiments, the ignore range may define parts of the message to be excluded from the normalization process. In one set of embodiments, the ignore range may include at least one of a left ignore field, a right ignore field, and an owner ignore field.

At block 510, the signature server may identify which parts of the message are within the ignore range. According to various sets of embodiments, the ignore range may specify a length of characters to be ignored in the message. For example, in one set of embodiments, the left ignore field may define the length of characters, as counted from the left-hand side of the message contents, to be excluded from the normalization process The right ignore field, correspondingly, may define the length of characters, as counted from the right-hand side of the message contents, to be excluded from the normalization process.

At block 515, the signature server may define at least one tokenization range indicating what values should be tokenized. In various embodiments, the tokenization range may include, without limitation, alphanumeric characters, such as letters and numeric digits; special characters, such as punctuation marks, whitespace, and other symbols and language scripts; control characters; numeric values as specified in binary, decimal, and hexadecimal, among other numeral systems. In one set of embodiments, the values may be defined in a flags field. In a further set of embodiments, the tokenization range may correspond to a sequential range of values. In other embodiments, the tokenization range may be defined as a set of values, which may not necessarily include a sequential range of characters, and which may include one or more characters, which have been chosen to be included in the set of values individually.

At block 520, the signature server may then define at least one token value. In various embodiments, as with the ignore range and tokenization range, token values may include, without limitation, alphanumeric characters, such as letters and numeric digits; special characters, such as punctuation marks, whitespace, and other symbols and language scripts; control characters; numeric values as specified in binary, decimal, and hexadecimal, among other numeral systems.

At block 525, the signature server may then replace parts of the message that are not within the ignore range, but found to be within the tokenization range, with the token value. In some embodiments, each character within the tokenization range may be replaced with the token value. In other embodiments, each string of characters within the tokenization range may be normalized to a single character having the token value.

Figure 6:
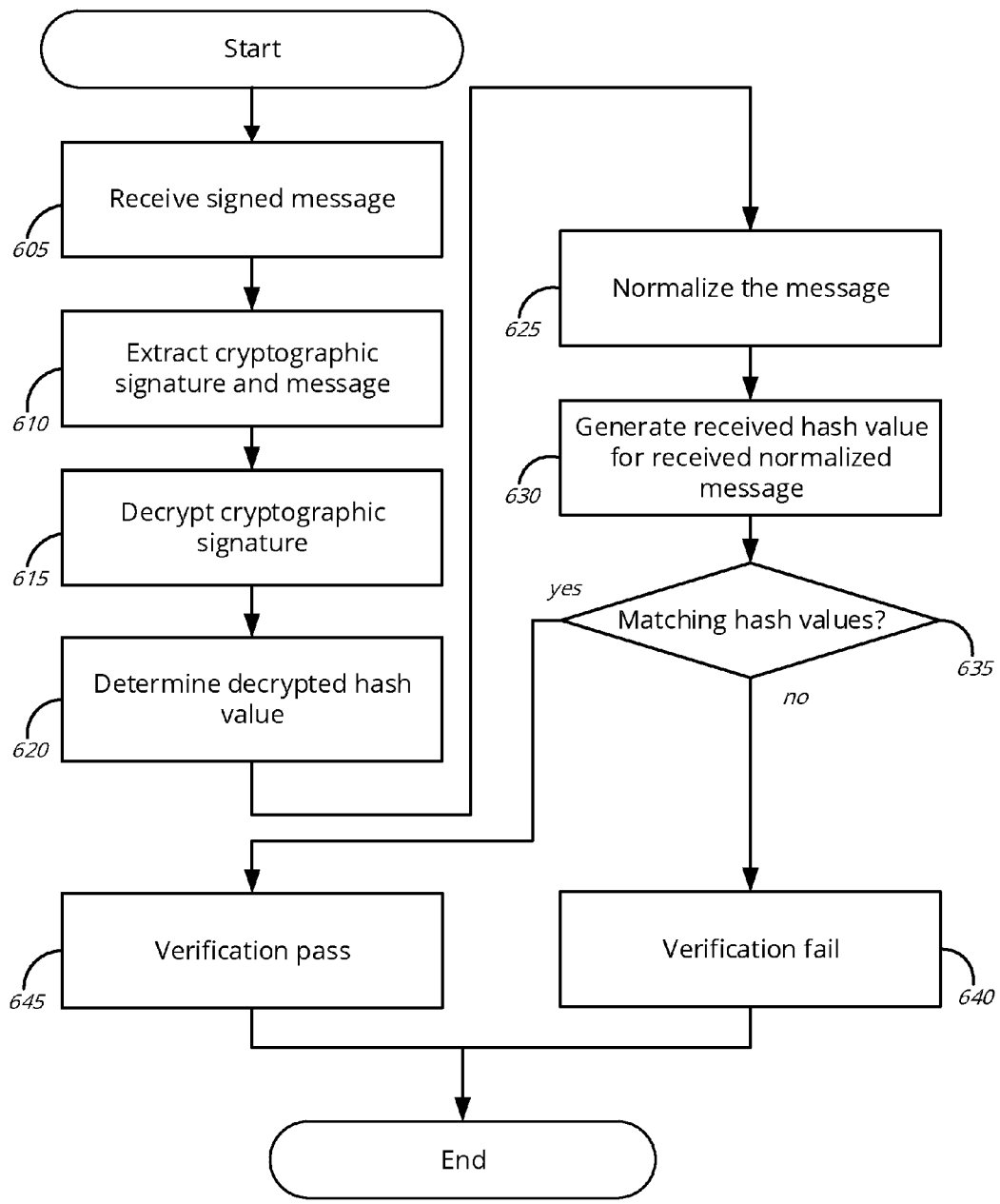
FIG. 6 is a flow diagram of verifying a cryptographically signed message with numeric pattern normalization, in accordance with various embodiments.

FIG. 6 illustrates a flow diagram of a method 600 of verifying a cryptographically signed message with numeric pattern normalization, in accordance with various embodiments. The method 600 begins, at block 605, by receiving, with the resolving client, the signed message from the signature server. In various embodiments, the resolving client may be a DNS resolver, and the signed message may be an answer from a name server.

At block 610, the resolving client may extract, from the signed message, the message and the cryptographic signature. In various embodiments, the message itself may be in its non-normalized state. At block 615, the resolving client continues by decrypting the cryptographic signature. According to a set of embodiments, the resolving client may utilize a known public key, corresponding to the private key used by the signature server, to decrypt the cryptographic signature. In another set of embodiments, the resolving client may obtain and authenticate a corresponding public key from a certificate authority. At block 620, the resolving client determines the decrypted hash from the decrypted cryptographic signature. At block 625, the resolving client continues by normalizing the received message. In various embodiments, the resolving client may utilize the same NPN normalization process as utilized by the signature server. At block 630, the resolving client generates a received hash value for the received normalized message. In various embodiments, the hash value may be obtained by utilizing the same hash function as utilized by the signature server. In one set of embodiments, the resolving client may request the hash function from the signature server. In another set of embodiments, the hash function may be included as part of the signed message by the signature server.

At decision block 635, the resolving client determines whether the decrypted hash value, as determined from the cryptographic signature, matches the received hash value for the received normalized message, by comparing the two hash values. At block 640, if resolving client determines that the decrypted hash value does not match the received hash value, the resolving client may determine that verification of the signed message has failed. At block 645, if the resolving client determines that the decrypted hash value and received hash value match, the resolving client may determine that the signed message has passed verification.

Figure 7:
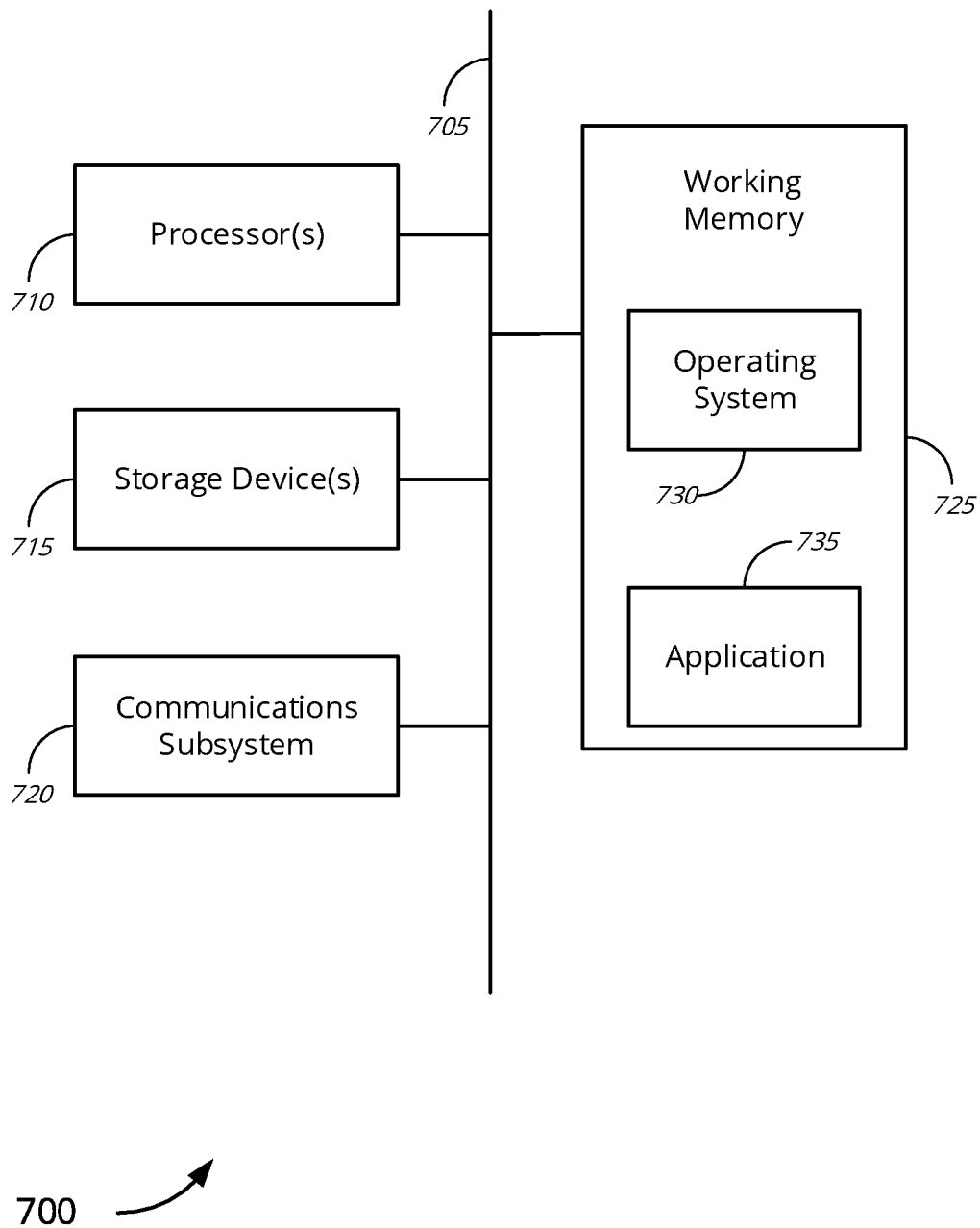
FIG. 7 is a schematic block diagram of computer hardware for a numeric pattern normalization device, in accordance with various embodiments.

FIG. 7 is a schematic block diagram of computer hardware for a numeric pattern normalization device 700, in accordance with various embodiments. FIG. 7 provides a schematic illustration of one embodiment of a computer system 700 that can perform the methods provided by various other embodiments, as described herein, and/or can perform the functions of the signature server, DNS authoritative name server, DNS resolver, resolver client, or any other computer systems as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or integrated manner.

The computer system 700 includes a plurality of hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like). In general, embodiments can employ as a processor any device, or combination of devices, that can operate to execute instructions to perform functions as described herein. Merely by way of example, and without limitation, any microprocessor (also sometimes referred to as a central processing unit, or CPU) can be used as a processor, including without limitation one or more complex instruction set computing (CISC) microprocessors, such as the single core and multicore processors available from Intel Corporation™ and others, such as Intel's X86 platform, including, e.g., the Pentium™, Core™, and Xeon™ lines of processors. Additionally and/or alternatively, reduced instruction set computing (RISC) microprocessors, such as the IBM Power™ line of processors, processors employing chip designs by ARM Holdings™, and others can be used in many embodiments. In further embodiments, a processor might be a microcontroller, embedded processor, embedded system, SoC or the like.

As used herein, the term "processor" can mean a single processor or processor core (of any type) or a plurality of processors or processor cores (again, of any type) operating individually or in concert. Merely by way of example, the computer system 700 might include a general-purpose processor having multiple cores, a digital signal processor, and a graphics acceleration processor. In other cases, the computer system might 700 might include a CPU for general purpose tasks and one or more embedded systems or microcontrollers, for example, to run real-time functions. The functionality described herein can be allocated among the various processors or processor cores as needed for specific implementations. Thus, it should be noted that, while various examples of processors 710 have been described herein for illustrative purposes, these examples should not be considered limiting.

The computer system 700 may further include, or be in communication with, one or more storage devices 715. The one or more storage devices 715 can comprise, without limitation, local and/or network accessible storage, or can include, without limitation, a disk drive, a drive array, an optical storage device, a solid-state drive, flash-based storage, or other solid-state storage device. The solid-state storage device can include, but is not limited to, one or more of a random access memory (RAM) or a read-only memory (ROM), which can be programmable, flash-updateable, or the like. Such storage devices may be configured to implement any appropriate data stores, including, without limitation, various file systems, database structures, or the like.

The computer system 700 might also include a communications subsystem 720, which can include, without limitation, a modem, a network card (wireless or wired), a wireless programmable radio, or a wireless communication device. Wireless communication devices may further include, without limitation, a Bluetooth device, an 802.11 device, a WiFi device, a WiMax device, a WWAN device, cellular communication facilities, or the like. The communications subsystem 720 may permit data to be exchanged with a customer premises, residential gateway, authentication server, a customer facing cloud server, network orchestrator, host machine servers, other network elements, or combination of the above devices, as described above. Communications subsystem 720 may also permit data to be exchanged with other computer systems, and/or with any other devices described herein, or with any combination of network, systems, and devices. According to some embodiments, the network might include a local area network (LAN), including without limitation a fiber network, or an Ethernet network; a wide-area network (WAN); a wireless wide area network (WWAN); a virtual network, such as a virtual private network (VPN); the Internet; an intranet; an extranet; a public switched telephone network (PSTN); an infra-red network; a wireless network, including without limitation a network operating under any of the IEEE 802.11 suite of protocols, the Bluetooth protocol, or any other wireless protocol; or any combination of these or other networks.

In many embodiments, the computer system 700 will further comprise a working memory 725, which can include a RAM or ROM device, as described above. The computer system 700 also may comprise software elements, shown as being currently located within the working memory 725, including an operating system 730, device drivers, executable libraries, and/or other code. The software elements may include one or more application programs 735, which may comprise computer programs provided by various embodiments, and/or may be designed to implement methods and/or configure systems provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 730 and/or other code, such as an application program 735) contained in the working memory 725. Such instructions may be read into the working memory 725 from another computer readable medium, such as one or more of the storage device(s) 715. Merely by way of example, execution of the sequences of instructions contained in the working memory 725 might cause the processor(s) 710 to perform one or more procedures of the methods described herein.

The terms "machine readable medium" and "computer readable medium," as used herein, refer to any medium that participates in providing data that causes a machine to operation in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical and/or tangible storage medium. In some embodiments, a computer readable medium may take many forms, including but not limited to, non-volatile media, volatile media, or the like. Non-volatile media includes, for example, optical and/or magnetic disks, such as the storage device(s) 715. Volatile media includes, without limitation, dynamic memory, such as the working memory 725.

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 720 (and/or components thereof) generally will receive the signals, and the bus 705 then might carry the signals (and/or the data, instructions, etc. carried by the signals) to the processor(s) 710, or working memory 725, from which the processor(s) 710 retrieves and executes the instructions. The instructions received by the working memory 725 may optionally be stored on a storage device 715 either before or after execution by the processor(s) 710.

According to a set of embodiments, the computer system 700 may be a signature server, a name server including an authoritative name server in a DNS, a DNS resolver, or a resolving client device. In various embodiments, each of one or more recursive name servers, root name server, other DNS servers, client end devices, or certificate authority server, may themselves also include one or more elements of the computer system 700.

According to various sets of embodiments, the computer system 700 may include computer readable media, having stored thereon a plurality of instructions, which, when executed by the processor 710, allows the computer system 700 to generate a message to be transmitted to a resolving client via communications subsystem 720. The computer system 700 may then normalize the message, via numeric pattern normalization. The computer system 700 may further, as part of the NPN normalization process, define at least one ignore range within the message. The computer system 700 may then identify at least part of the message that is within the ignore range. The computer system 700 may further define, as part of the NPN normalization process, at least one tokenization range indicating which values are to be tokenized, and at least one token value corresponding to the at least one tokenization range. The computer system 700 may then replace all parts of the message, not within the ignore range and having values within the at least one tokenization range, with the at least one token value. Based on the normalized message, the computer system 700 may generate a hash value for the normalized message. A cryptographic signature may then be generated by the computer system, based on the hash value. The hash value may be encrypted with the signature server's private key, through public-key cryptography, to generate the cryptographic signature. Thus, a signed message is generated having both the original, non-normalized message, that has been signed with the cryptographic signature. The computer system 700 may then transmit the signed message to a resolving client, via the communications subsystem 720.

According to one set of embodiments, the computer system 700 may be part of a domain name system having a plurality of name servers. The computer system 700 may be an authoritative name server further having been programmed with instructions to receive, from the resolving client, a domain name query, and the message may further include an answer to the domain name query. The computer system 700 may further include instructions to instantiate a numeric pattern normalization resource record, the numeric pattern normalization resource record. The resource record may further include definitions for the at least one ignore range, at least one tokenization range, and at least one token value. In some embodiments, the at least one ignore range may include an owner ignore field, a left ignore field, and a right ignore field. The owner ignore field may further define the length of characters, counted from a left side of an owner field of the answer to the domain name query, to be included in the at least one ignore range. The left ignore field may further define the length of characters, counted from a left-hand side of a RDATA field of the answer to the domain name query, to be included in the at least one ignore range. The right ignore field may further define the length of characters, counted from a right-hand side of the RDATA field of the answer to the domain name query, to be included in the at least one ignore range.

In another set of embodiments, the at least one tokenization range and the at least one token value may be defined as decimal values. Alternatively, in some embodiments, the at least one tokenization range and the at least one token value may defined in hexadecimal values. In further sets of embodiments, at least one of hyphens or periods may be treated as numbers to be included in the at least one tokenization range. In some further embodiments, the tokenization range may include at least part of a tokenization set. The computer system 700 may then further include instructions to allow each character to be defined in the tokenization set individually.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for numeric pattern normalization for cryptographic signatures comprising:
   a resolving client in communication with a plurality of name servers;
   an at least one signature server of the plurality of name of the plurality of name servers, each of the at least one signature server comprising:
      at least one processor;
      non-transitory computer readable media having encoded thereon computer software comprising a set of instructions executable by the at least one processor to:
         generate a message to be transmitted to a resolving client;
         normalize the message, via numeric pattern normalization, wherein numeric pattern normalization further comprises:
            defining at least one ignore range within the message;
            identifying at least part of the message that is within the ignore range;

defining an at least one tokenization range indicating which values are to be tokenized;

defining at least one token value corresponding to the at least one tokenization range;

replacing all parts of the message, not within the ignore range and having values within the at least one tokenization range, with the at least one token value;

generate a hash value for the normalized message;

generate a cryptographic signature, wherein the cryptographic signature comprises the hash value encrypted with a private key, wherein the private key has a corresponding public key;

generate a signed message having the message signed with the cryptographic signature; and transmit the signed message to the resolving client.

2. The system of claim 1, wherein the resolving client further comprises:

at least one processor;

non-transitory computer readable media having encoded thereon computer software comprising a set of instructions executable by the at least one processor to:

receive, via the at least one signature server, the signed message having both the cryptographic signature and message;

decrypt the cryptographic signature with the public key to yield a decrypted hash value;

normalize the message, via numeric pattern recognition, utilizing the at least one ignore range, at least one tokenization range, and at least one token value, as defined by the at least one signature server, resulting in a received normalized message;

generate a received hash value for the received normalized message;

compare the decrypted hash value with the received hash value; and verify the signed message, wherein if the decrypted hash value and received hash value match, the signed message is verified.

3. The system of claim 2, wherein the plurality of name servers further comprise at least part of a domain name system including the plurality of name servers, the plurality of name servers in communication with each other, wherein the at least one signature server is an authoritative name server further having been programmed with instructions to receive, from the resolving client, a domain name query, and wherein the message comprises an answer to the domain name query.

4. The system of claim 3, wherein the cryptographic signature is valid for a set of at least two answers to the domain name query.

5. The system of claim 3, wherein the at least one signature server is further programmed with instructions to instantiate a numeric pattern normalization resource record, the numeric pattern normalization resource record further including definitions for the at least one ignore range, at least one tokenization range, and at least one token value.

6. The system of claim 3, wherein the at least one ignore range includes at least one of an owner ignore field, a left ignore field, and a right ignore field, wherein:

the owner ignore field further defines the length of characters, counted from a left side of an owner field of the answer to the domain name query, to be included in the at least one ignore range;

the left ignore field further defines the length of characters, counted from a left-hand side of a RDATA field of the answer to the domain name query, to be included in the at least one ignore range; and the right ignore field further defines the length of characters, counted from a right-hand side of the RDATA field of the answer to the domain name query, to be included in the at least one ignore range.

7. The system of claim 1, wherein the at least one tokenization range and the at least one token value are defined in decimal values.

8. The system of claim 1, wherein the at least one tokenization range and the at least one token value are defined in hexadecimal values.

9. The system of claim 1, wherein at least one of hyphens or periods are treated as numbers to be included in the at least one tokenization range.

10. The system of claim 1, wherein the tokenization range includes at least part of a tokenization set, wherein the set of instructions further comprises instructions to define each character to be included in the tokenization set individually.

11. A numeric pattern normalization device comprising:

at least one processor;

non-transitory computer readable media having encoded thereon computer software comprising a set of instructions executable by the at least one processor to:

generate a message to be transmitted to a resolving client;

normalize the message, via numeric pattern normalization, wherein numeric pattern normalization further comprises:

defining at least one ignore range within the message;

identifying at least part of the message that is within the ignore range;

defining an at least one tokenization range indicating which values are to be tokenized;

defining at least one token value corresponding to the at least one tokenization range;

replacing all parts of the message, not within the ignore range and having values within the at least one tokenization range, with the at least one token value;

generate a hash value for the normalized message;

generate a cryptographic signature, wherein the cryptographic signature comprises the hash value encrypted with a private key, wherein the private key has a corresponding public key;

generate a signed message having the message signed with the cryptographic signature; and transmit the signed message to a resolving client.

12. The numeric pattern normalization device of claim 11, wherein the numeric pattern normalization device comprises at least part of an authoritative name server of a domain name system, further having been programmed with instructions to receive, from the resolving client, a domain name query, and wherein the message comprises an answer to the domain name query.

13. The numeric pattern normalization device of claim 12, wherein the set of instructions further includes instructions to instantiate a numeric pattern normalization resource record, the numeric pattern normalization resource record further including definitions for the at least one ignore range, at least one tokenization range, and at least one token value.

14. The numeric pattern normalization device of claim 12, wherein the at least one ignore range includes an owner ignore field, a left ignore field, and a right ignore field, wherein:

the owner ignore field further defines the length of characters, counted from a left side of an owner field of the answer to the domain name query, to be included in the at least one ignore range;

the left ignore field further defines the length of characters, counted from a left-hand side of a RDATA field of the answer to the domain name query, to be included in the at least one ignore range; and the right ignore field further defines the length of characters, counted from a right-hand side of the RDATA field of the answer to the domain name query, to be included in the at least one ignore range.

15. The numeric pattern normalization device of claim 11, wherein the at least one tokenization range and the at least one token value are defined in decimal values.

16. The numeric pattern normalization device of claim 11, wherein the at least one tokenization range and the at least one token value are defined in hexadecimal values.

17. The numeric pattern normalization device of claim 11, wherein at least one of hyphens or periods are treated as numbers to be included in the at least one tokenization range.

18. The numeric pattern normalization device of claim 11, wherein the tokenization range includes at least part of a tokenization set, wherein the set of instructions further comprises instructions to define each character to be included in the tokenization set individually.

19. A method of numeric pattern normalization for cryptographic signatures comprising:

generating, via at least one signature server, a message to be transmitted to a resolving client;

normalizing, via the at least one signature server, the message, via numeric pattern normalization, wherein numeric pattern normalization further comprises:

defining, at the at least one signature server, at least one ignore range within the message;

identifying, via the at least one signature server, at least part of the message that is within the ignore range;

defining, at the at least one signature server, an at least one tokenization range indicating which values are to be tokenized;

defining, at the at least one signature server, at least one token value corresponding to the at least one tokenization range;

replacing, via the at least one signature server, all parts of the message, not within the ignore range and having values within the at least one tokenization range, with the at least one token value;

generating, via the at least one signature server, a hash value for the normalized message;

generating, via the at least one signature server, a cryptographic signature, wherein the cryptographic signature comprises the hash value encrypted with a private key, wherein the private key has a corresponding public key;

generating, via the at least one signature server, a signed message including the message signed with the cryptographic signature; and transmitting, via the at least one signature server, the signed message to a resolving client.

20. The method of claim 19, further comprising:

receiving, via the resolving client, the signed message having both the cryptographic signature and message;

decrypting, via the resolving client, the cryptographic signature with the public key to yield a decrypted hash value;

normalizing, via the resolving client, the message, via numeric pattern recognition, utilizing the at least one ignore range, at least one tokenization range, and at least one token value, as defined by the at least one signature server, resulting in a received normalized message;

generating, via the resolving client, a received hash value for the received normalized message;

comparing, via the resolving client, the decrypted hash value with the received hash value; and verifying, via the resolving client, the signed message, wherein if the decrypted hash value and received hash value match, the signed message is verified.

* * * * *